(12) United States Patent
Dueso et al.

(10) Patent No.: US 10,919,785 B2
(45) Date of Patent: Feb. 16, 2021

(54) HYDRAULIC CONVEYOR OF FLOATING OBJECTS PROVIDED WITH A DEVICE FOR SANITISING CONVEYING COMPOSITION, PLANT PROVIDED WITH SUCH A CONVEYOR AND SANITISING METHOD

(71) Applicants: MAF AGROBOTIC, Montauban (FR); INSTITUT NATIONAL POLYTECHNIQUE DE TOULOUSE, Toulouse (FR); CENTRE NATIONAL DE LA RECHERCHE SCIENTIFIQUE, Paris (FR); UNIVERSITE TOULOUSE III—PAUL SABATIER, Toulouse (FR)

(72) Inventors: Bernard Dueso, Montech (FR); Philippe Blanc, Montauban (FR); Caroline Andriantsiferana, Deyme (FR); Catherine Ayral, Ramonville-St-Agne (FR); Florence Benoit-Marquie, Buzet-sur-Tarn (FR); Philippe Destrac, Toulouse (FR); Carine Julcour, Toulouse (FR)

(73) Assignees: MAF AGROBOTIC, Montauban (FR); INSTITUT NATIONAL POLYTECHNIQUE DE TOULOUSE, Toulouse (FR)

( * ) Notice: Subject to any disclaimer, the term of this patent is extended or adjusted under 35 U.S.C. 154(b) by 87 days.

(21) Appl. No.: 16/080,124

(22) PCT Filed: Feb. 24, 2017

(86) PCT No.: PCT/EP2017/054378
§ 371 (c)(1),
(2) Date: Aug. 27, 2018

(87) PCT Pub. No.: WO2017/144688
PCT Pub. Date: Aug. 31, 2017

(65) Prior Publication Data
US 2019/0218112 A1    Jul. 18, 2019

(30) Foreign Application Priority Data

Feb. 26, 2016  (FR) .................................. 16 51638

(51) Int. Cl.
*C02F 1/32* (2006.01)
*C02F 1/72* (2006.01)
(Continued)

(52) U.S. Cl.
CPC .............. *C02F 1/325* (2013.01); *B65G 51/01* (2013.01); *C02F 1/722* (2013.01); *C02F 1/725* (2013.01);
(Continued)

(58) Field of Classification Search
CPC ...... C02F 1/00; C02F 1/30; C02F 1/32; C02F 1/325; C02F 1/72; C02F 1/722;
(Continued)

(56) References Cited

U.S. PATENT DOCUMENTS

| | | | |
|---|---|---|---|
| 8,097,086 B2 * | 1/2012 | Lapoujade | ............ C13B 20/123 |
| | | | 127/41 |
| 2005/0276890 A1 * | 12/2005 | Baker | .................... B65G 37/00 |
| | | | 426/333 |

(Continued)

FOREIGN PATENT DOCUMENTS

| | | | | |
|---|---|---|---|---|
| EP | 1167306 A1 * | 1/2002 | ................. | C02F 9/00 |
| FR | 2956595 A1 * | 8/2011 | ............. | B08B 1/008 |
| WO | WO-2011160186 A1 * | 12/2011 | .............. | C02F 1/325 |

OTHER PUBLICATIONS

Fallman et al., Applicability of the Photo-Fenton method for treating water containing pesticides, 1999, Catalysis Today, 54, 309-319 (Year: 1999).*

(Continued)

*Primary Examiner* — Natasha E Young
(74) *Attorney, Agent, or Firm* — IPSILON USA, LLP

(57) ABSTRACT

A hydraulic conveyor for floating objects, having recirculation of a liquid composition, named conveying composition, for conveying the floating objects, includes at least one device for sanitizing the conveying composition. The sanitizing device includes: at least one device irradiating a composition, named composition to be sanitized, formed by mixing at least some of the conveying composition and an amount of a composition, named photoreactive composition, including at least one photosensitive compound that forms, under the effect of irradiation by the irradiation device, at least one compound, named active compound, transforming by chemical reaction at least one pollutant compound of the conveying composition into a non-pollutant compound; and at least two photolysis chambers mounted in series such that the composition to be sanitized can flow successively into the at least two photolysis chambers, at least one irradiation device being arranged in an inner volume of each photolysis chamber.

17 Claims, 5 Drawing Sheets

(51) Int. Cl.
| | | |
|---|---|---|
| *B65G 51/01* | (2006.01) | |
| *C02F 101/30* | (2006.01) | |
| *C02F 103/26* | (2006.01) | |
| *C02F 103/32* | (2006.01) | |

(52) U.S. Cl.
CPC ........ *B65G 2201/0211* (2013.01); *C02F 1/32* (2013.01); *C02F 2101/306* (2013.01); *C02F 2103/26* (2013.01); *C02F 2103/32* (2013.01); *C02F 2201/3227* (2013.01); *C02F 2305/10* (2013.01)

(58) Field of Classification Search
CPC .. C02F 1/725; C02F 2101/00; C02F 2101/30; C02F 2101/306; C02F 2101/3227; C02F 2103/00; C02F 2103/26; C02F 2103/32; C02F 2305/00; C02F 2305/10; B65G 51/01; B65G 2201/00; B65G 2201/02; B65G 2201/0202; B65G 2201/021
See application file for complete search history.

(56) References Cited

U.S. PATENT DOCUMENTS

2011/0203612 A1* 8/2011 Blanc ...................... B08B 1/008
134/6
2016/0016830 A1 1/2016 Christopher et al.

OTHER PUBLICATIONS

Google search on Jul. 29, 2020 (Year: 2020).*
International Search Report, PCT/EP2017/054378, dated Apr. 21, 2017.

* cited by examiner

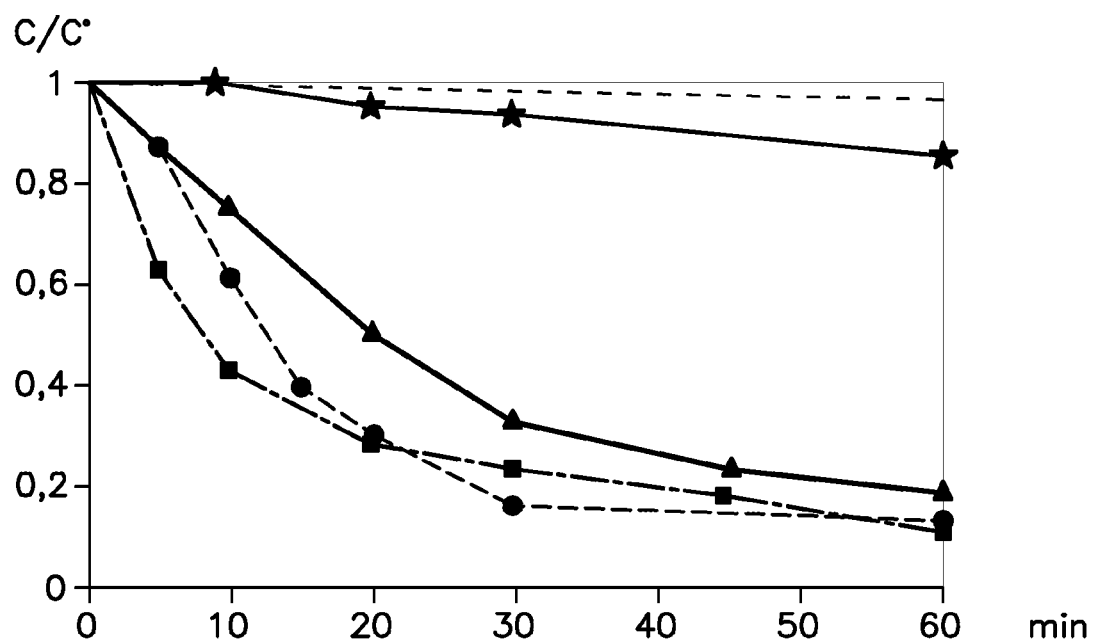

HYDRAULIC CONVEYOR OF FLOATING OBJECTS PROVIDED WITH A DEVICE FOR SANITISING CONVEYING COMPOSITION, PLANT PROVIDED WITH SUCH A CONVEYOR AND SANITISING METHOD

This application is a National Phase of PCT/EP2017/054378, now WO2017/144688, filed on Feb. 24, 2017, which claims priority to French Patent Application No. 16/51638, filed on Feb. 26, 2016.

The invention relates to a hydraulic conveyor for floating objects such as fruit or vegetables, of the type having recirculation of conveying composition—in particular an aqueous composition—comprising a device for sanitising the conveying composition. The invention also relates to a sorting plant—in particular a sorting and packaging plant—for such floating objects provided with such a hydraulic conveyor, and to a method for sanitising such a conveying composition.

Throughout the text:

the expression "floating objects" denotes objects having sufficient buoyancy in a stream of liquid in order to be able to be transported thereby. This terminology covers not only the objects floating on the surface of the stream of liquid but also the objects submerged in the liquid, but of which the density is low enough to allow them to be transported in the stream of liquid, in particular submerged between two bodies of water;

the terms "upstream" and "downstream" are defined with respect to the direction of flow of a conveying composition conveying the floating objects such as fruit or vegetables;

the term "decontamination" or "sanitisation" denotes the total or partial elimination of undesirable compounds—in particular compounds which are toxic to humans—present in a conveying composition of a hydraulic conveyor of the type having recirculation of conveying composition, of a sorting (and packaging) plant for floating objects such as fruit or vegetables;

the term "recirculation" denotes, in the normal manner, the movement of a fluid in a closed circuit; and the term "luminous" and its derivatives denotes any electromagnetic radiation with a wavelength between 100 nm and 1 mm and thus covers ultraviolet light, the visible range, and infrared light;

the expression "at least substantially" indicates, in a conventional manner, that a structural or functional feature should not be understood to be marking a sudden discontinuity, which would have no physical meaning, but covers not only this structure or this function but also slight variations in this structure or this function which, in the technical context in question, produce an effect of the same nature, if not of the same degree.

After harvesting, fruit and/or vegetables, such as e.g. apples, can be conveyed—floating—into a plant for sorting these fruit and/or vegetables in which they are sorted based on criteria such as their size and/or their shape and/or their colour and/or their weight and/or their quality—internal or external—and grouped into batches of fruit and/or vegetables having similar characteristics.

There is known from FR 2 956 595 a unit for automatically sorting fruit and vegetables based on predetermined selection criteria allowing products to be grouped into batches ready for packaging. In such a sorting and packaging unit, the fruit and vegetables are conveyed, floating in hydraulic channels such that the fruit and vegetables are in contact with the water flowing in the hydraulic channels.

During these operations of conveying, sorting and preparing batches ready to be packaged, at least some of the pesticides—e.g. fungicides and/or insecticides—present on the surface of these fruit and/or these vegetables may be dissolved in the water of the hydraulic channels. For example, in the case of sorting and packaging apples, pesticides such as boscalid, fludioxonil, thiacloprid and pyraclostrobin are identified in the water of the hydraulic channels.

Furthermore, during these operations of conveying, sorting and preparing batches ready to be packaged, microorganisms and/or mycotoxins produced by fungi and/or mould on the surface of the fruit and/or vegetables may also contaminate the water of the hydraulic channels.

In a sorting plant comprising a hydraulic conveyor of the type having recirculation of the aqueous composition of hydraulic channels, this aqueous composition is in contact with all the conveyed fruit and/or vegetables. It follows from this that the concentration of pesticide and/or of microorganisms and/or of mycotoxins in the aqueous composition increases as new fruit is introduced into the hydraulic conveyor. It is thus desirable to sanitise the aqueous composition of the hydraulic channels to package fruit having contents of pesticides which satisfy food standards.

There is thus a need to provide a solution allowing the (total or partial) elimination of such pesticides, microorganisms and/or mycotoxins in the aqueous composition of the hydraulic channels and to allow the packaging of floating objects which are clean and suitable for human consumption.

In the majority of cases, there is provided a member for continuous filtration of the aqueous conveying composition flowing in the hydraulic channels. This filtration can be ensured by a filter comprising activated carbon allowing filtration of particles suspended in the water as well as trapping some organic compounds by adsorption. However, the filtration of the water of hydraulic channels on a filter of activated carbon poses numerous problems.

On the one hand, the activated carbon has a limited capacity to adsorb organic chemical compounds such that after a quantity of adsorbed organic compounds is exceeded, the activated carbon is saturated and filter becomes ineffective. Furthermore, this loss of filtering efficiency cannot be anticipated and requires the constant implementation of tests to analyse the amount of pollutants exiting the filter. The loss of filtering efficiency is thus detected only at a late stage and some packaged products may not satisfy official standards with respect to these pollutants.

On the other hand, in the event of saturation of the activated carbon in the activated carbon filter, the solution consists of replacing the activated carbon in the activated carbon filter which requires filtering to be stopped and possibly requires a complete shutdown of the plant for processing fruit and/or vegetables, which is undesirable in some applications for which the device must preferably be able to operate continuously.

Furthermore, such continuous filtration of the flow of the liquid flowing in the hydraulic channels is, in general, only a partial filtration, taking into account the large volume of liquid supplying the hydraulic channels. With such a partial filtration, impurities present in the flow of liquid are recycled into the hydraulic channels and begin to contaminate these channels once again.

The invention aims to overcome all of these disadvantages. In particular, the invention aims to overcome all of the disadvantages inherent in using activated carbon filters in a hydraulic conveyor.

The invention also aims to propose a hydraulic conveyor, a plant comprising such a hydraulic conveyor and a method for sanitising aqueous conveying composition of such a hydraulic conveyor allowing official regulations relating to the amount of pesticides associated with packaged fruit and vegetables for human consumption to be satisfied.

The invention also aims to propose a hydraulic conveyor, a plant comprising such a hydraulic conveyor and a method for sanitising aqueous conveying composition of such a hydraulic conveyor allowing the amount of pesticides such as, e.g., boscalid, fludioxonil, pyraclostrobin or thiacloprid, microorganisms or mycotoxins such as patulin present on the surface of packaged fruit and vegetables to be reduced.

The invention also aims to propose a hydraulic conveyor, a plant comprising such a hydraulic conveyor and a method for sanitising aqueous conveying composition of such a hydraulic conveyor which are highly efficient, in particular with respect to the decontamination of an aqueous conveying composition having a high level of boscalid, e.g. in the order of 200 µg per litre.

The invention also aims to propose a hydraulic conveyor, a plant comprising such a hydraulic conveyor and a method for sanitising aqueous conveying composition of such a hydraulic conveyor which are efficient whatever the value of the degree of hardness of the aqueous conveying composition, in particular for a high value of the degree of hardness (i.e. for "hard" water), e.g. for water having a calcium bicarbonate level in the order of 350 mg/l.

The invention also aims to propose a hydraulic conveyor, a plant comprising such a hydraulic conveyor and a method for sanitising aqueous conveying composition of such a hydraulic conveyor allowing a reduction in the toxicity by inducing permanent damage to the DNA (genotoxicity)— e.g. evaluated on *Xenopus laevis* amphibians—of an aqueous conveying composition of a hydraulic conveyor of the type having recirculation.

To do this, the invention relates to a hydraulic conveyor for floating objects selected from the group formed of fruit and vegetables, of the type having recirculation of a liquid composition, named conveying composition, for conveying the floating objects, said hydraulic conveyor being provided with at least one device for sanitising said conveying composition; characterised in that at least one sanitising device comprises:

at least one irradiation device arranged to be able to irradiate a composition, named composition to be sanitised, formed by mixing at least some of said conveying composition and an amount of a composition, named photoreactive composition, comprising at least one photosensitive compound selected to be able to form, under the effect of irradiation by at least one irradiation device, at least one compound, named active compound, able to transform by chemical reaction at least one pollutant compound of said conveying composition into a non-pollutant compound; and at least two photolysis chambers mounted in series such that said composition to be sanitised can flow successively into said at least two photolysis chambers, at least one irradiation device being arranged in an inner volume of each photolysis chamber.

The inventors have observed in particular:

that it is possible to sanitise a conveying composition of a hydraulic conveyor for floating objects selected from the group formed of fruit and vegetables, the hydraulic conveyor being of the type having recirculation of conveying composition, by mixing said conveying composition with a photoreactive composition and by subjecting the mixture to irradiation in a sanitising device comprising a plurality of photolysis chambers, each photolysis chamber comprising an irradiation device, and under conditions suitable to be able to form in this mixture and under the effect of the irradiation at least one chemical species which can react with at least one pollutant of said conveying composition;

that it is possible to form in this mixture an amount of at least one reactive chemical species, this amount being sufficient to allow transformation of "undesirable" pollutant compounds of said conveying composition into compounds which are not pollutants to form a conveying composition which is at least substantially sanitised; and that such a sanitising treatment is effective to sanitise said conveying composition but also allows the formation, upon exiting the sanitising device, of a sanitised conveying composition having a reduced content of photosensitive compound originating from the reactive chemical species, such a reduced content of photosensitive compound being compatible with contacting the conveying composition with fruit and/or vegetables intended for human consumption.

The inventors have observed in particular that such a sanitising device and such a method allow effective decontamination—in particular with respect to undesirable organic colorant compounds, mycotoxins such as patulin and pesticides such as, for example boscalid, fludioxonil, pyraclostrobin or thiacloprid—of said conveying composition but also allow only a residual amount of the photosensitive compound to remain in said conveying composition, said residual amount of photosensitive compound of the sanitised composition being less than the maximum amount of photosensitive compound in an aqueous composition able to be contacted with food products and allowed by the regulations.

Without any explanation being given to this observation, it has been noted that the flow of the composition to be sanitised into a plurality of photolysis chambers mounted in series in accordance with the invention, each photolysis chamber comprising a device for irradiating said composition to be sanitised, in fact allows the sanitising efficiency to be increased and the residual amount of photosensitive compound exiting the sanitising device to be reduced, said residual amount of photosensitive compound of the sanitised composition being less than the maximum amount of photosensitive compound in an aqueous composition able to be contacted with food products and allowed by the regulations. It has also been noted that a sanitising device comprising a plurality of photolysis chambers mounted in series, at least one irradiation device being arranged in the inner volume of each of the photolysis chambers, in fact allows the composition to be sanitised to be more efficiently sanitised than would be the case with a sanitising device comprising a single photolysis chamber sized with respect to the size of the hydraulic conveyor and the volume of the composition to be sanitised.

Advantageously, at least one irradiation device is arranged in an inner volume of each photolysis chamber so as to be able to be in contact with said composition to be sanitised and to be able to irradiate said composition to be sanitised flowing in each photolysis chamber.

Advantageously, in some embodiments in accordance with the invention, the sanitising device comprises at least one irradiation device positioned so as to allow irradiation of a flow of composition to be sanitised comprising at least one photosensitive compound, to allow the formation, in said composition to be sanitised, of at least one chemical species which can react with at least one pollutant of said conveying composition under the effect of the irradiation by the irradiation device and to allow the sanitisation of said composition to be sanitised.

The invention can be applied to any liquid conveying composition. Advantageously, in some embodiments in accordance with the invention, said conveying composition is an aqueous composition. Advantageously and in some embodiments in accordance with the invention, said aqueous conveying composition is mainly formed of water, in particular has a water volume content greater than 95%, in particular greater than 99%.

At least one pollutant compound is a compound introduced into the conveying composition by fruit or by vegetables. This may be pesticides applied to the fruit or to the vegetables as they are being grown or harvested. This may also be an intrinsic colorant of the fruit and/or vegetables released into the conveying composition. This may also be microorganisms, mould or microscopic fungi which may release mycotoxins on the surface of the fruit and/or vegetables. At least one pollutant compound may be a compound released by the mould or by the microscopic fungi on the surface of the fruit and/or vegetables. At least one pollutant compound may thus be a mycotoxin such as, for example, patulin.

Advantageously and in some embodiments in accordance with the invention, at least one sanitising device is adapted to have a flow of composition to be sanitised pass through it and to allow the irradiation of the composition to be sanitised by at least one irradiation device between an inlet for a flow of composition to be sanitised (in the sanitising device) drawn into a hydraulic channel of the conveyor, and an outlet for the flow of composition, named sanitised composition, (outside of the sanitising device) directed towards a hydraulic channel of the conveyor.

Advantageously, and in accordance with the invention, the sanitising device comprises a plurality of irradiation devices, each irradiation device being positioned in a photolysis chamber so as to allow irradiation of a flow of composition to be sanitised flowing successively into each photolysis chamber and comprising at least one photosensitive compound, to allow the formation, in said composition to be sanitised, of at least one chemical species which can react with at least one pollutant of said conveying composition under the effect of the irradiation and to allow the sanitisation of said composition to be sanitised.

Advantageously, each photolysis chamber of the sanitising device comprises an irradiation device.

Advantageously and in some embodiments in accordance with the invention, at least one irradiation device comprises at least one light source adapted to emit ultraviolet light radiation, in particular at a wavelength between 100 nm and 315 nm, more particularly between 100 nm and 280 nm (UV-C), substantially in the order of 254 nm. Advantageously, the sanitising device of a hydraulic conveyor in accordance with the invention is adapted to allow adjustment of the wavelength of irradiation depending upon the chemical nature and reactivity of the photosensitive compound(s).

Advantageously and in some embodiments in accordance with the invention, at least one photosensitive compound is hydrogen peroxide. Advantageously, the composition to be sanitised comprises a mass amount of hydrogen peroxide such that the ratio of this mass amount to the mass of said composition to be sanitised is between 1 ppm and 15 ppm, in particular between 1 ppm and 5 ppm, preferably in the order of 3 ppm. However, any other photosensitive compound which is able to ensure the above-mentioned technical function in accordance with the invention can be used.

Advantageously and in some embodiments in accordance with the invention, the hydraulic conveyor comprises at least one circulation pump for composition to be sanitised formed from the conveying composition in the sanitising device. Such a circulation pump is selected to be able to form a flow of composition to be sanitised in the sanitising device, irradiate the composition to be sanitised flowing in the sanitising device and produce a sanitised composition such that this sanitised composition can be directed towards a hydraulic channel. Advantageously and in accordance with the invention, the hydraulic conveyor comprises a device for mixing the conveying composition and the photoreactive composition and for forming the composition to be sanitised upstream of the sanitising device.

Advantageously and in some embodiments in accordance with the invention, the hydraulic conveyor comprises a pump for distributing photoreactive composition into said conveying composition. Advantageously, the pump for distributing photoreactive composition, the circulation pump for the conveying composition and the irradiation devices are adapted to be able to form, in the composition to be sanitised, at least one active compound able to transform at least one pollutant compound of said conveying composition into a non-pollutant compound. Therefore, advantageously, the distribution pump is a pump metering the amount of photoreactive composition introduced into said conveying composition. Advantageously and in accordance with the invention, the sanitising device comprises means for measuring the concentration of photosensitive compound in the conveying composition exiting the sanitising device and means for controlling the distribution pump adapted to allow adjustment of a flow of photoreactive composition distributed into the conveying composition.

Advantageously and in accordance with the invention, the sanitising device comprises a plurality of photolysis chambers mounted in series such that said composition to be sanitised flows successively into the plurality of photolysis chambers, at least one irradiation device being arranged in the inner volume of each photolysis chamber and so as to be able to be in contact with said composition to be sanitised and able to irradiate said composition to be sanitised flowing in each photolysis chamber.

Each photolysis chamber can comprise a single irradiation device. However, there is nothing to prevent each photolysis chamber from comprising a plurality of irradiation devices.

In some particular embodiments in accordance with the invention, at least one—in particular each—photolysis chamber is in the shape of a cylinder of revolution and includes a plurality of light sources in the form of tubes, each light source extending in parallel with the longitudinal axis of said photolysis chamber and facing one another, the plurality of light sources being uniformly distributed in said photolysis chamber.

In some particular embodiments in accordance with the invention, at least one—in particular each—photolysis chamber is in the shape of a cylinder of revolution and includes a plurality of light sources in the form of tubes, each light source extending in parallel with the longitudinal axis of said photolysis chamber and facing one another, the plurality of light sources being distributed in said photolysis chamber so as to be positioned at the points of a regular polygon, as seen in any cross-section of said photolysis chamber.

Advantageously and in accordance with the invention, the light sources of the plurality of light sources are uniformly distributed in the inner volume of said photolysis chamber.

Advantageously and in a preferred embodiment in accordance with the invention, at least one—in particular each—photolysis chamber is in the shape of a cylinder of revolution and includes five light sources in the form of tubes, each light source extending in parallel with the longitudinal axis of said photolysis chamber and facing one another, the five light sources being distributed in said photolysis chamber so as to be positioned at the points of a regular pentagon, as seen in any cross-section of said photolysis chamber.

However, there is nothing to prevent the light sources from being distributed in said photolysis chamber so as to be positioned at the points of a regular hexagon, as seen in any cross-section of said photolysis chamber.

A hydraulic conveyor in accordance with the invention is adapted to be able to form a flow of composition to be sanitised in the sanitising device such that said composition to be sanitised flows into the sanitising device between an inlet for said composition to be sanitised and an outlet for sanitised composition and to be able to perform irradiation of said composition to be sanitised by an irradiation device. The sanitising device is adapted to be able to control the efficiency of the sanitising process of said composition to be sanitised by adjusting at least one of the following parameters:

the flow rate of said composition to be sanitised in the sanitising device;

the light intensity emitted by the irradiation device and the light intensity received by said composition to be sanitised in the sanitising device; and the concentration of photosensitive compound in said composition to be sanitised.

Advantageously and in some particular embodiments in accordance with the invention, the sanitising device comprises an inlet for photoreactive composition located upstream of a first photolysis chamber of the plurality of photolysis chambers. The expression "first chamber" is defined with respect to the direction of flow of composition to be sanitised in the sanitising device. There is nothing to prevent the sanitising device from comprising an inlet for photoreactive composition in the first photolysis chamber of the plurality of photolysis chambers. First photolysis chamber of the plurality of photolysis chambers is understood to mean the photolysis chamber of the plurality of photolysis chambers located furthest upstream in the sanitising device.

Advantageously, the sanitising device comprises a single inlet for photoreactive composition located upstream of the first photolysis chamber of the plurality of photolysis chambers. However, there is nothing to prevent the sanitising device from comprising a plurality of inlets for photoreactive composition distributed in the sanitising device.

The invention likewise relates to a sorting plant—in particular a sorting and packaging plant—comprising at least one hydraulic conveyor in accordance with the invention. A plant for sorting (and packaging) floating objects such as fruit and/or vegetables in accordance with the invention thus comprises at least one hydraulic conveyor in accordance with the invention provided with a device for sanitising a composition for conveying floating objects selected from the group formed of floating fruit and vegetables.

The invention likewise relates to a sanitising method implemented in a conveyor in accordance with the invention. It thus relates to a method for sanitising a liquid composition, named conveying composition, for conveying floating objects selected from the group formed of fruit and vegetables, of a hydraulic conveyor of the type having recirculation of said conveying composition, characterised in that:

at least some of said conveying composition is mixed with an amount of composition, named photoreactive composition, comprising at least one photosensitive compound selected to be able to form, under the effect of irradiation by at least one irradiation device, at least one compound, named active compound, able to transform by chemical reaction—in particular by oxidation—at least one pollutant compound of said conveying composition into a non-pollutant compound; and this mixture, named composition to be sanitised, is subjected to this irradiation so as to form an at least partially sanitised composition; characterised in that said composition to be sanitised is subjected to this irradiation in a sanitising device which has a flow of said composition to be sanitised passing through it, the sanitising device comprising at least two photolysis chambers mounted in series such that said composition to be sanitised flows successively into said at least two photolysis chambers, at least one irradiation device being arranged in an inner volume of each photolysis chamber.

Advantageously, in some embodiments in accordance with the invention, sanitising treatment is performed on the conveying composition by causing conveying composition to flow in a closed circuit in the sanitising device and irradiating, in the sanitising device, a composition to be sanitised obtained by mixing at least some of the conveying composition with a photoreactive composition.

Advantageously and in accordance with the invention, the amount of said photoreactive composition and irradiation conditions are adapted so as to optimise the degradation of the pollutants and the reduction in the concentration thereof in the conveying composition.

Advantageously, in some embodiments in accordance with the invention, the amount of said photoreactive composition and irradiation conditions are adapted such that the sanitised composition has a residual amount of photosensitive compound which is less than a predetermined maximum amount allowed by regulations. Under these conditions, such a method is effective to quickly sanitise a conveying composition but also allows only a residual amount of hydrogen peroxide in the sanitised composition to remain in said conveying composition, said amount being less than the maximum amount of hydrogen peroxide allowed by the regulations for a liquid composition able to be in contact with food products.

Advantageously, in some embodiments in accordance with the invention, at least one photosensitive compound is hydrogen peroxide.

Advantageously and in some embodiments in accordance with the invention, the irradiation is an illumination with ultraviolet light radiation—in particular ultraviolet light radiation having a wavelength between 100 nm and 315 nm, more particularly between 100 nm and 280 nm (UV-C), substantially in the order of 254 nm—allowing the photolysis of hydrogen peroxide.

The inventors have also observed that a method in accordance with the invention allows a conveying composition formed of any type of water to be sanitised. They observed that a method in accordance with the invention allows the sanitisation of a conveying composition formed from water with a high hardness value (e.g. water comprising calcium bicarbonate at a concentration in the order of 350 mg/l) or from water with a medium hardness value (e.g. water comprising calcium bicarbonate at a concentration in the order of 200 mg/l).

Advantageously and in some embodiments in accordance with the invention, said composition to be sanitised is irradiated at ambient temperature. Such a method in accordance with the invention is thus simple to implement and does not require the use of specific heating and/or cooling means for the composition to be sanitised.

Advantageously, in some embodiments of a method in accordance with the invention, a conveying composition comprising, as a pollutant, at least one pesticide selected from the group formed of fungicides, bactericides and insecticides is sanitised.

The invention also relates to a device for sanitising a conveying composition for implementing a method in accordance with the invention.

The invention thus also relates to a device for sanitising a liquid composition, named conveying composition, for conveying floating objects selected from the group formed of fruit and vegetables, for a hydraulic conveyor of the type having recirculation of said conveying composition, said sanitising device comprising:

at least one irradiation device;

at least two photolysis chambers mounted in series so as to be able to have a flow of a liquid composition, named composition to be sanitised, pass through it, said composition being formed by mixing a liquid composition, named conveying composition, flowing in a hydraulic channel of the hydraulic conveyor, and a composition, named photoreactive composition, comprising at least one photosensitive compound selected to be able to form, under the effect of irradiation by at least one irradiation device, at least one compound, named active compound, able to transform by chemical reaction at least one pollutant compound of said conveying composition into a non-pollutant compound; characterised in that at least one irradiation device is arranged in an inner volume of each photolysis chamber.

The invention thus relates to a device for sanitising a conveying composition, comprising an irradiation device arranged to be able to irradiate a composition, named composition to be sanitised, formed by mixing at least some of said conveying composition and an amount of a composition, named photoreactive composition, comprising at least one photosensitive compound selected to be able to form, under the effect of irradiation by an irradiation device, at least one compound, named active compound, able to transform at least one pollutant compound of said conveying composition into a non-pollutant compound by chemical reaction between the active compound and the pollutant compound.

Therefore, advantageously and in accordance with the invention, the sanitising device comprises an inlet for a flow of said composition to be sanitised into the sanitising device and an outlet for a flow of a sanitised composition, the outlet for the flow of sanitised composition being separate from the inlet for the flow of composition to be sanitised.

Advantageously and in accordance with the invention, the sanitising device comprises a plurality of photolysis chambers mounted in series such that said composition to be sanitised can flow successively into the plurality of photolysis chambers, at least one irradiation device being arranged in an inner volume of each photolysis chamber. Each irradiation device is arranged so as to be able to be in contact with said composition to be sanitised and to be able to irradiate said composition to be sanitised flowing in each photolysis chamber. Advantageously, each photolysis chamber comprises at least one irradiation device. Advantageously, the sanitising device comprises between two and ten photolysis chambers mounted in series. Advantageously, the sanitising device comprises between three and six photolysis chambers mounted in series. Advantageously, the sanitising device comprises four photolysis chambers mounted in series.

Advantageously, in some embodiments in accordance with the invention, at least one photolysis chamber is in the shape of a cylinder of revolution and includes a plurality of light sources in the form of tubes, each tube extending in parallel with the longitudinal axis of said at least one photolysis chamber and facing the others, the light sources of the plurality of light sources being distributed in said photolysis chamber so as to be positioned at the points of a regular polygon, as seen in any cross-section of said photolysis chamber.

Advantageously, in some embodiments in accordance with the invention, at least one photolysis chamber is in the shape of a cylinder of revolution and includes five light sources in the form of tubes, each tube extending in parallel with the longitudinal axis of said at least one photolysis chamber and facing the others, the five light sources being distributed in said photolysis chamber so as to be positioned at the points of a regular pentagon, as seen in any cross-section of said photolysis chamber.

The invention likewise relates to a hydraulic conveyor, a plant for sorting floating objects, a sanitising method and a sanitising device for a conveying composition, which are characterised in combination by all or some of the features mentioned above or below.

Other aims, features and advantages of the invention will become apparent upon reading the following description given solely by way of non-limiting example and which makes reference to the attached figures in which:

FIG. 7 is a graph of the neutralisation of boscalid by the implementation of a variant of a method in accordance with the invention.

Figure 1:
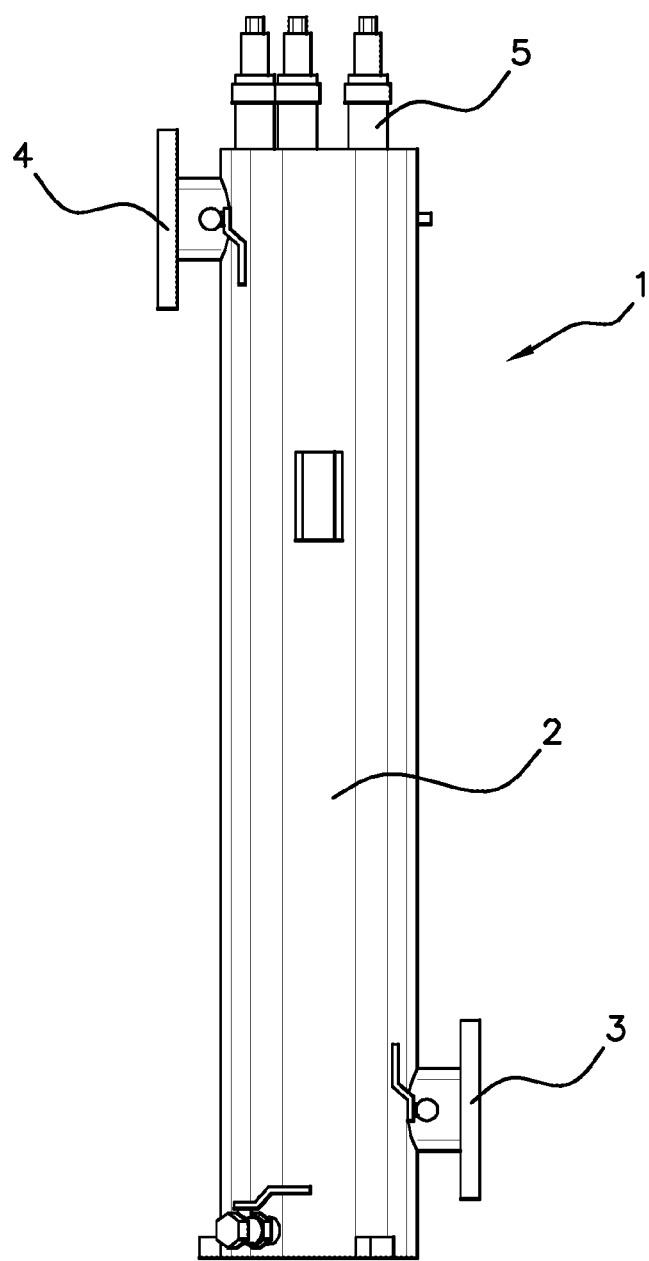
FIG. 1 is an overall view of a photolysis chamber of a sanitising device in accordance with the invention.

A photolysis chamber 1 of a device for sanitising a conveying composition of a hydraulic conveyor in accordance with one embodiment of the invention is shown in FIG. 1. This photolysis chamber 1 comprises a rigid cylindrical body 2. The cylindrical body 2 is hollow and liquid-tight and is of the type allowing circulation of an aqueous liquid composition within the cylindrical body between an inlet 3 for composition to be sanitised and an outlet 4 for sanitised composition, having a lesser amount of pollutant compounds than the composition to be sanitised, in particular substantially free of pollutant compounds. The inlet 3 for composition to be sanitised is in fluid communication with a hydraulic channel of a hydraulic conveyor for conveying floating objects such as fruit or vegetables of a plant for sorting and packaging such products. The outlet 4 for sanitised composition is in fluid communication with this same hydraulic channel such that the conveying composition can be indefinitely recycled in the hydraulic conveyor in accordance with the invention. Said photolysis chamber 1 allows the conveying composition of the hydraulic conveyor in accordance with the invention to be recycled in a closed circuit. Said photolysis chamber 1 allows the conveying composition of the plant to be sanitised by illuminating the conveying composition flowing in said photolysis chamber 1. The photolysis chamber 1 comprises at least one light source 5 arranged in an inner space of the cylindrical body 2 and in contact with the composition to be sanitised flowing in said photolysis chamber 1.

Figure 2:
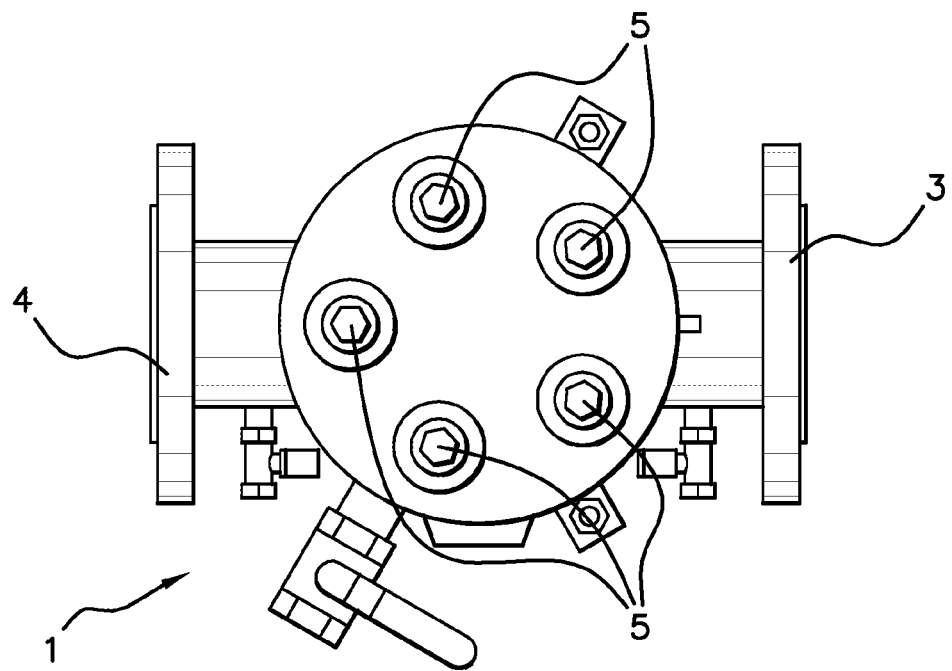
FIG. 2 is a top view of a photolysis chamber of a sanitising device in accordance with the invention.

The photolysis chamber 1 also shown in FIG. 2 has five light sources formed from light tubes distributed in the inner space of the cylindrical body 2, the five light tubes extending in parallel with each other in the inner space and substantially in parallel with the longitudinal axis of the cylindrical body 2. Advantageously, the five light tubes are distributed with respect to each other in the inner space of the cylindrical body 2 such that each light tube is positioned at the point of a regular pentagon, as seen in any cross-section of the cylindrical body 2. In this particular configuration, the light tubes allow optimum illumination of the composition to be sanitised passing through the photolysis chamber 1 in a flow oriented in parallel with the longitudinal axis of the cylindrical body 2.

Figure 3:
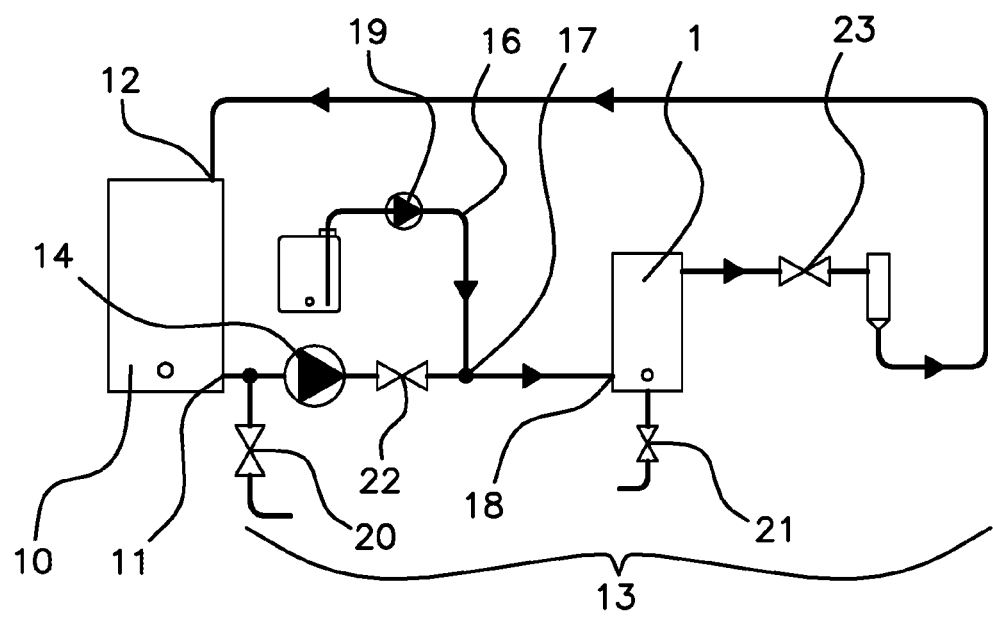
FIG. 3 is a schematic view of a sanitising device in accordance with a first aspect of the invention.

A device 13 for sanitising a composition for conveying floating objects such as fruit or vegetables is shown schematically in FIG. 3, coupled to a hydraulic conveyor in accordance with the invention. Such a conveyor comprises a container 10 for conveying floating objects in which products such as fruit or vegetables are conveyed whilst floating. The container 10 can be a hydraulic channel for conveying floating objects extending in part upstream of a plant for sorting and packaging fruit and vegetables or a hydraulic channel for conveying sorted floating objects extending in part downstream of the plant for sorting and packaging fruit and vegetables. It can also be a hydraulic conveyor for floating objects such as floating fruit or vegetables to a plant for sorting and packaging said products. The container 10 is sized in accordance with the size of the plant for sorting and packaging floating objects such as fruit and vegetables, in accordance with the number and dimensions of the hydraulic channels of the plant. Such a container 10 can contain, for example, a volume of conveying composition between 10 m$^3$ and 1000 m$^3$, in particular in the order of 90 m$^3$ to 100 m$^3$.

The container 10 has an orifice 11 for drawing a composition to be sanitised and an orifice 12 for recycling a sanitised composition in the container 10. The sanitising device 13 extends between the drawing orifice 11 and the recycling orifice 12 of the container 10 and forms a circuit external to the container 10. The sanitising device 13 comprises a pump 14 for circulating the composition to be sanitised adapted to be able to draw said composition to be sanitised from the drawing orifice 11 of the container 10, cause the composition to be sanitised to flow in an external circuit to a photolysis chamber 1 and pump the sanitised composition into the recycling orifice 12 of the container 10. The circulation pump 14 is adapted to be able to control the flow rate of composition to be sanitised to be a predetermined value. For example, the flow rate of the circulation pump 14 can vary between several m$^3$/h and 100 m$^3$/h.

The sanitising device 13 comprises a plurality of photolysis chambers (indicated by reference numeral 1) comprising at least one light source able to illuminate the composition to be sanitised flowing in each photolysis chamber. Each photolysis chamber has an inner volume in the order of 30 to 40 litres and five fluorescent tubes, 254 nm, with a power of 200 watts able to provide an irradiation intensity to the composition to be sanitised of a value in the order of 500 mJ/cm$^2$ with a flow rate of the composition to be sanitised of a value in the order of 6 m$^3$/h in each photolysis chamber. Other values are possible.

The sanitising device 13 also comprises a path 16 for introducing a photoreactive composition into the external circuit. The introduction path 16 preferably issues into the external circuit via an inlet 17 for photoreactive composition positioned upstream of the plurality of photolysis chambers such that the introduction of the photoreactive composition into the conveying composition forms the composition to be sanitised close to an inlet 18 for composition in the plurality of photolysis chambers. The photoreactive composition comprises at least one photosensitive compound able to form, in the composition to be sanitised, at least one chemical species which can react with at least one pollutant present in the conveying composition under the effect of illumination by the light source(s). The introduction path 16 comprises a pump 19 for distributing the photoreactive composition in the external circuit and in the plurality of photolysis chambers.

The distribution pump 19 of the sanitising device 13 thus allows the adjustment of the flow rate of photoreactive composition to be introduced into the flow of conveying composition drawn from the container 10 so as to form a flow of composition to be sanitised in the plurality of photolysis chambers and to allow decontamination of the composition to be sanitised and the formation of a sanitised composition exiting the plurality of photolysis chambers.

The sanitised composition is reintroduced into the container 10 under the effect of the circulation pump 14. The sanitised composition further has a concentration of photosensitive compound—in particular of hydrogen peroxide—lower than the maximum concentration allowed by regulations for the use of the sanitised composition in contact with food products. The flow rate of the recirculation pump 14 is adjusted with respect to the volume of the container 10 and the flow rate of the pump 19 for distributing the photoreactive composition such that the proportion of pollutant in the conveying composition is kept at a low value which is acceptable for its use in contact with food products.

A hydraulic conveyor in accordance with the invention shown schematically in FIG. 3 also has a drain valve 20 of the hydraulic conveyor. It also has a drain valve 21 of the plurality of photolysis chambers allowing the implementation of servicing and maintenance operations on the plurality of photolysis chambers. A hydraulic conveyor in accordance with the invention shown schematically in FIG. 3 also has valves 22, 23 for adjusting the flow rate of the flow of conveying composition in the sanitising device 13.

Figure 4:
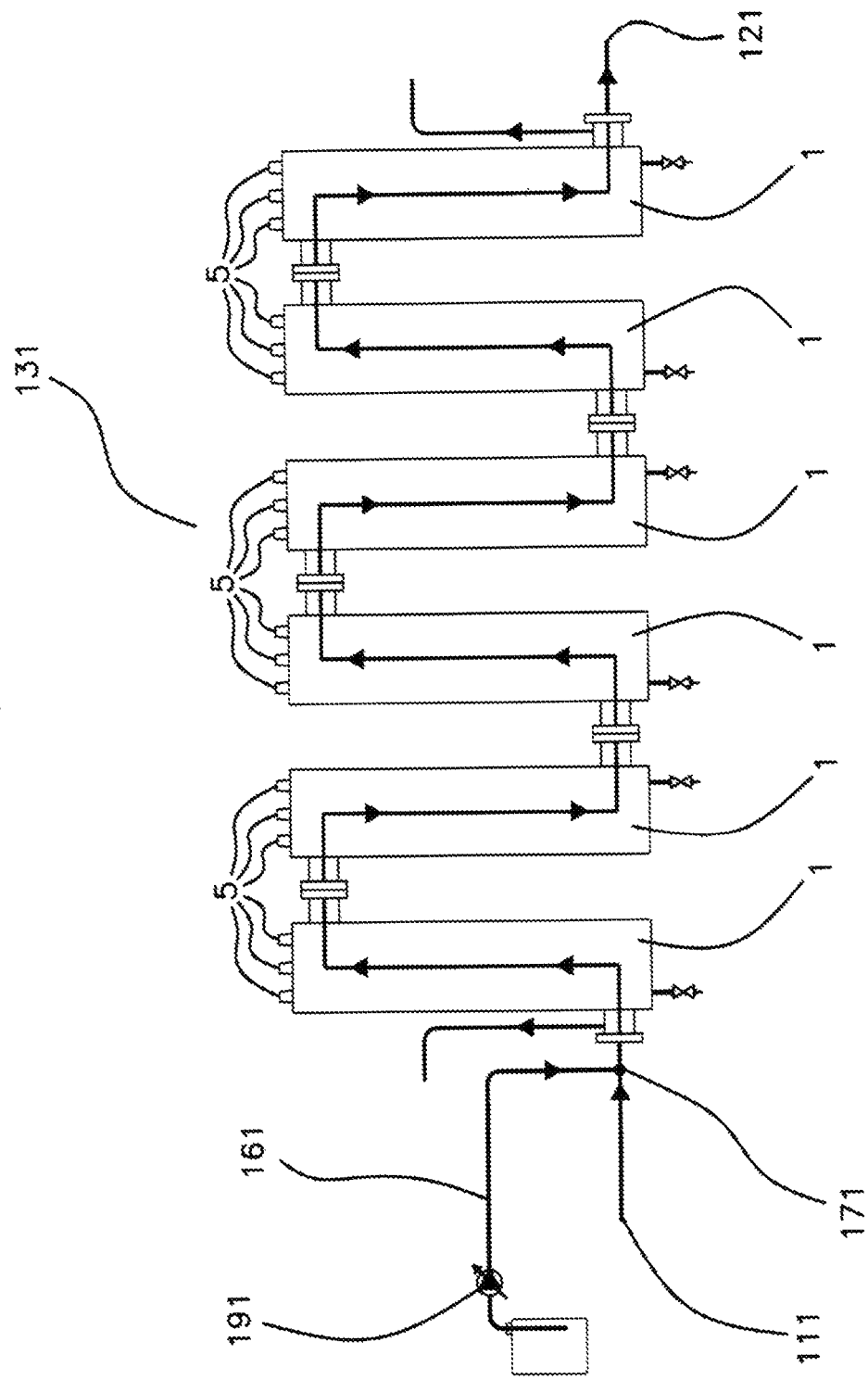
FIG. 4 is a schematic view of a sanitising device in accordance with another aspect of the invention.

Another embodiment of a device 131 for sanitising a composition for conveying floating objects such as fruit or vegetables is shown schematically in FIG. 4. In FIG. 4, the hydraulic conveyor in accordance with the invention is not shown in its entirety.

The sanitising device 131 extends between an orifice 111 for drawing conveying composition in a hydraulic channel for conveying floating objects of a hydraulic conveyor and an orifice 121 for recycling sanitised conveying composition in a hydraulic channel of the hydraulic conveyor. The sanitising device 131 comprises a plurality of photolysis chambers 1 mounted in series and allowing the composition to be sanitised to flow successively into each photolysis chamber 1 in which it is irradiated.

Each photolysis chamber 1 comprises at least one light source able to illuminate the composition to be sanitised flowing in the sanitising device 131. Each photolysis chamber 1 can be of the type described in FIG. 1 and FIG. 2. Each photolysis chamber has for example an inner volume in the order of 30 to 40 litres and five fluorescent tubes, 254 nm, with a power of 200 watts able to provide an irradiation intensity to the composition to be sanitised of a value in the order of 500 mJ/cm$^2$ with a flow rate of the composition to be sanitised of a value in the order of 6 m$^3$/h in each photolysis chamber 1. Other values are possible.

The sanitising device 13 also comprises a path 161 for introducing a photoreactive composition upstream of the sanitising device 131. The introduction path 161 preferably issues into the sanitising device 131 via an inlet 171 for photoreactive composition positioned upstream of the first (upstream) photolysis chamber 1 such that the mixing of the photoreactive composition in the conveying composition forms the composition to be sanitised close to an inlet 181 for composition in the upstream photolysis chamber 1. The introduction path 161 comprises a pump 191 for metering (distributing) the photoreactive composition in the sanitising device 131 and in the upstream photolysis chamber 1.

EXAMPLE 1

A flow rate of conveying composition of 6 m$^3$/h is established in the external circuit and a flow rate of photoreactive composition of 3 dm$^3$/h is established, the photoreactive composition being an aqueous solution of hydrogen peroxide at an initial concentration of 4 g/l. The thereby obtained composition to be sanitised thus has a hydrogen peroxide proportion in the order of 2 ppm and is sufficient to allow the decontamination of the composition to be sanitised exiting the photolysis tank formed of a single photolysis chamber comprising five fluorescent tubes with an individual power of 200 W.

EXAMPLE 2

A hydraulic conveyor of a plant for sorting and packaging apples is selected containing a volume of 90 m$^3$ of a conveying composition containing "BELLIS" at a concentration of 50 m g/l (and boscalid at a concentration of 22 µg/l). A flow rate of the conveying composition of 36 m$^3$/h is established in the external circuit using the circulation pump 14 and a flow rate of photoreactive composition of 270 cm$^3$/h is established using the distribution pump 19, the photoreactive composition being an aqueous solution of hydrogen peroxide at an initial concentration of 400 g/l, i.e. 108 g or pure hydrogen peroxide. Under these conveying composition flow conditions, all of the volume of the conveying composition contained in the plant is theoretically treated within 2.5 hours. The composition to be sanitised obtained at the inlet of the sanitising device thus has an initial hydrogen peroxide proportion in the order of 3 ppm and is sufficient to allow the decontamination of the composition to be sanitised at the outlet of the sanitising device formed of 6 photolysis chambers mounted in series, each chamber comprising five fluorescent tubes with an individual power of 200 W.

The results obtained are shown in Table 1 hereinafter in which the concentration values of boscalid in the composition to be sanitised at the inlet of the photolysis tank (EC), at the outlet of the third chamber (S3E) of the photolysis tank and at the outlet of the sixth chamber (S6E) of the photolysis tank are given in µg/l. The column S6E/EC represents the ratio multiplied by 100 of the boscalid concentration at the outlet of the sixth chamber (S6E) of the photolysis tank to the boscalid concentration at the inlet of the photolysis tank (EC). The column $C/C_0$ represents the ratio of the boscalid concentration measured at the inlet of the photolysis tank over time to the initial boscalid concentration (t=0).

TABLE 1

| | Boscalide, µg/l | | | | |
|---|---|---|---|---|---|
| Time, hours | EC | S3E | S6E | S6E/EC, % | $C/C_0$ |
| 0 | 21.43 | — | — | — | — |
| 1.25 | 16.64 | — | 1.28 | 92 | 0.79 |
| 2.5 | 15.68 | 3.96 | 0.99 | 94 | 0.73 |
| 3.75 | 15.56 | 3.38 | 0.91 | 94 | 0.73 |
| 5 | 14.06 | 2.71 | 0.56 | 94 | 0.66 |
| 7.5 | 8.25 | 1.78 | — | — | 0.38 |

The rate of degradation of the boscalid between the inlet and outlet of the photolysis tank is high and is greater than 90%. This treatment allows the elimination of 62% of the boscolid of the conveying composition of the hydraulic conveyor within 7.5 hours.

EXAMPLE 3

A hydraulic conveyor of a plant for sorting and packaging apples is selected containing a volume of 90 m$^3$ of water as composition for conveying Ariane, Rosy Glow and Pink Lady apples. A flow rate of conveying composition of 36 m$^3$/h is established in the external circuit and a flow rate of photoreactive composition of 2.8 to 3.5 dm$^3$/h is established, the photoreactive composition being an aqueous solution of hydrogen peroxide at an initial concentration of 400 g/l. Under these flow conditions, all of the volume of the conveying composition of the hydraulic conveyor is theoretically treated within 2.5 hours. The composition at the inlet of the sanitising device has an initial hydrogen peroxide proportion in the order of 3 ppm sufficient to allow the decontamination of the composition at the outlet of the sanitising device formed of six photolysis chambers mounted in series, each chamber comprising five fluorescent tubes with an individual power of 200 W.

The results obtained are shown in Table 2 hereinafter in which the concentration values of boscalid from the apples conveyed with the composition to be sanitised at the inlet of the sanitising device (EC) and at the outlet of sanitising device (SC) are given in µg/l. The column SE/EC represents the ratio multiplied by 100 of the boscalid concentration at the outlet of the sixth chamber of the photolysis tank to the boscalid concentration at the inlet of the photolysis tank (EC). The column $C/C_0$ represents the ratio of the boscalid concentration measured at the inlet of the sanitising device over time to the initial boscalid concentration (t=0).

TABLE 2

| | Boscalide, µg/l | | | |
|---|---|---|---|---|
| Time, hours | EC | SC | SC/EC, % | $C/C_0$ |
| 0 | 2.83 | — | 100 | — |
| 4 | 4.76 | 0.065 | 98.6 | — |
| 7 | 2.84 | 0.206 | 92.8 | — |
| 7.1 | 4.19 | — | 100 | 1 |
| 10.5 | 1.73 | 0.062 | 96.4 | 0.41 |
| 12.5 | 1.35 | — | 100 | 0.32 |

TABLE 2-continued

| | Boscalide, µg/l | | | |
|---|---|---|---|---|
| Time, hours | EC | SC | SC/EC, % | C/C$_0$ |
| 14.75 | 1.71 | 0.058 | 96.6 | 0.41 |
| 17.25 | 1.18 | 0.040 | 96.6 | 0.28 |
| 19.25 | 1.88 | — | 100 | 0.45 |
| 22.75 | 1.07 | 0.064 | 94 | 0.25 |
| 24.75 | 0.64 | 0.057 | 91.2 | 0.15 |
| 28.75 | 0.66 | 0.039 | 94 | 0.16 |
| 29.75 | 0.93 | — | 100 | 0.22 |
| 32.25 | 0.79 | 0.040 | 95 | 0.19 |
| 34.75 | 0.73 | 0.043 | 94.1 | 0.17 |

Between 90% and 100% of the boscalid of the conveying composition is eliminated during this treatment.

EXAMPLE 4

Semi-Industrial Pilot Device

A semi-industrial pilot device in accordance with one aspect of the invention comprises a tank for recirculating water to be treated of a volume of 1000 l, a circulation pump ensuring a circulation flow of the water to be treated in a sanitising device with a flow rate between 4 m³ to 8 m³/h. The sanitising device comprises a photolysis chamber comprising an inlet for water from the recirculation tank and an outlet for sanitised water directed to the recirculation tank. The photolysis chamber is formed of a rigid tubular envelope, of which the external wall is opaque to light and forming an inner space suitable for receiving five fluorescent tubes with a longitudinal axis extending in parallel with the longitudinal axis of the rigid tubular envelope. The inner volume of the decontamination reactor is in the order of 32 l.

The five fluorescent tubes are tubes of 200 W emitting light at a wavelength of 254 nm and arranged longitudinally in the tubular envelope at the five points of a regular pentagon and in contact with the water to be treated flowing in the photolysis chamber. In this configuration of the sanitising device, the water to be sanitised flowing in contact with the five fluorescent tubes is subjected to substantially homogeneous illumination in the order of 500 mJ/cm² for a circulation flow rate of water to be sanitised in the order of 6 m³/h. The semi-industrial pilot device also comprises a tank for storing an aqueous solution of hydrogen peroxide ($H_2O_2$) provided with a pump for distributing said solution in the circulation flow of water to be sanitised issuing into the circuit of water to be sanitised upstream of and in proximity to the photolysis chamber. The concentration of the hydrogen peroxide in the aqueous solution of hydrogen peroxide is between 2 m g/l and 13 mg/l. The set-point flow rate of the pump for distributing solution of $H_2O_2$ is kept at 4 l/h.

Figure 5:
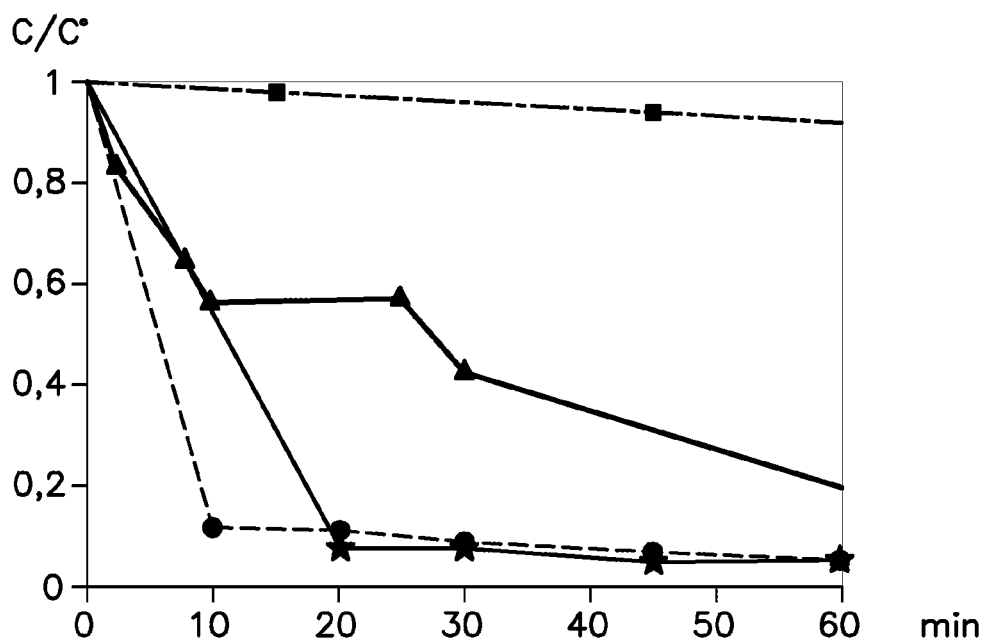
FIG. 5 is a graph of the neutralisation of boscalid by a variant of a method in accordance with the invention.

FIG. 5 shows the change in the ratio of the value of the boscalid concentration in the recirculation tank to the value of the initial boscalid concentration in the recirculation tank. The flow rate of the recycling pump is 6 m³/h and the initial boscalid concentration in the recirculation tank is 250 µg/l. The 5 lamps of the sanitising device are switched on. Under illumination and in the absence of hydrogen peroxide (curve designated by the symbols ■), the degradation of the boscalid is limited and reaches 10% of the initial boscalid after one hour of treatment. The initial addition (curve designated by the symbols *) of hydrogen peroxide at a concentration of 13 mg/l, or the successive addition (curve designated by the symbols ●) of 3 doses of hydrogen peroxide at a concentration of 13 mg/l does not have a major difference on the final rate (95%) of degradation of the boscalid. The continuous addition (curve designated by the symbols ▲) of hydrogen peroxide at a concentration of 2 mg/l provides an initial degradation of the boscalid equivalent to that obtained with the addition of hydrogen peroxide at the concentration of 13 mg/l. The interruption of this addition (between 10 min and 25 min) results in the degradation of the boscalid stopping, showing the total and rapid consumption of the hydrogen peroxide in the conveying composition. Re-starting the addition of hydrogen peroxide at the concentration of 2 mg/l results in the degradation of the boscalid starting again in the conveying composition.

EXAMPLE 5

Sanitisation with Respect to Different Pesticides

Figure 6:
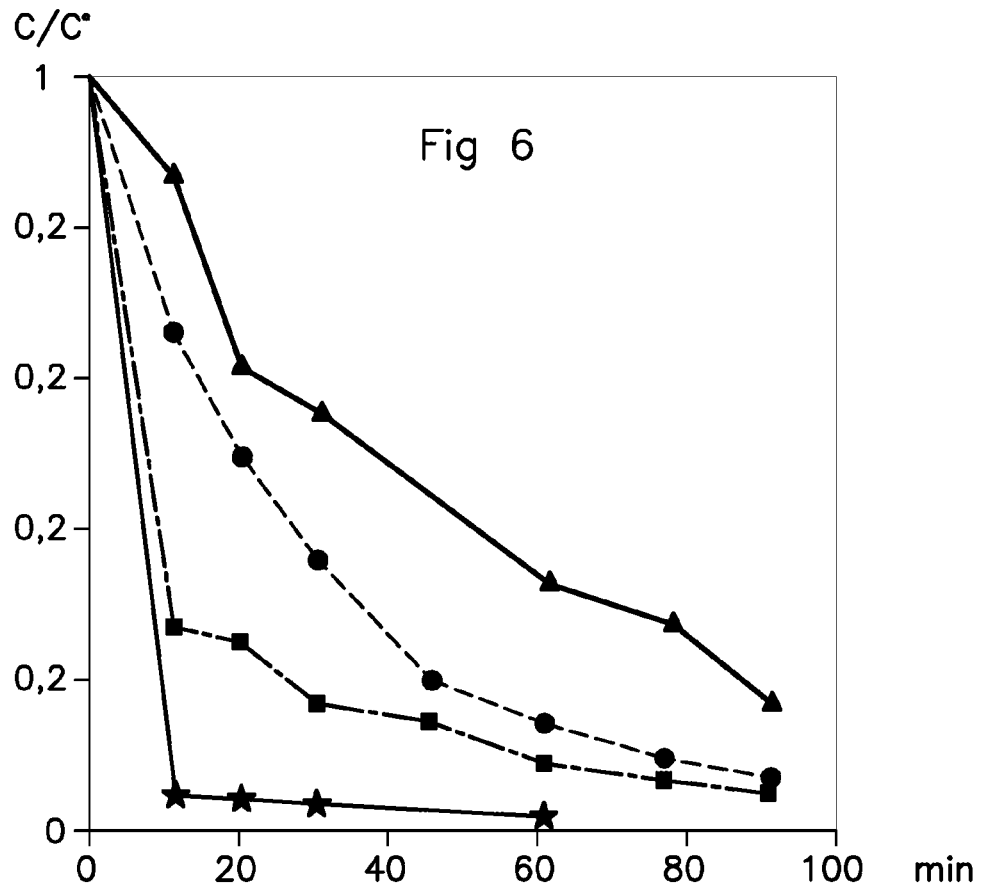
FIG. 6 is a graph of the neutralisation of four pesticides by a method in accordance with the invention.

A study was carried out in a semi-industrial pilot device as described above on the degradation of boscalid, thiacloprid, fludioxonil and pyraclostrobin. The flow rate of the conveying composition provided by the recirculation pump is 6 m³/h. The initial boscalid concentration in the recirculation tank is 250 µg/l. The initial thiacloprid concentration in the recirculation tank is 100 µg/l. The initial fludioxonil concentration in the recirculation tank is 100 µg/l. The initial pyraclostrobin concentration in the recycling tank is 125 µg/l. The initial hydrogen peroxide concentration in the composition to be sanitised is 2 µg/l. The five lamps of the photolysis chamber are switched on. The results are shown in FIG. 6 which shows that the boscalid (▲) is degraded to 70% within 1 hour, the pyraclostrobin (●) is degraded to 85% within 1 hour, the fludioxonil (■) is degraded to 90% within 1 hour and the thiacloprid (*) is degraded to more than 95% within 1 hour.

EXAMPLE 6

Sanitisation with Respect to Different Amounts of Boscalid

A study was carried out in a semi-industrial pilot device as described above on the degradation of boscalid at concentrations of 25 µg/l, 80 µg/l and 200 µg/l. The flow rate of the conveying composition provided by the recycling pump is 6 m³/h. An aqueous solution of hydrogen peroxide is continuously added upstream of the sanitising device such that the initial hydrogen peroxide concentration in the composition to be sanitised is 2 mg/l. The results are shown in FIG. 7 in which the dashed curve (---) represents a treatment by illumination, the curve designated by (*) represents a treatment with just hydrogen peroxide, i.e. without illumination at 254 nm, the curve (■) represents a treatment of a composition to be sanitised comprising boscalid at a concentration of 25 µg/l, the curve (○) represents a treatment of a composition to be sanitised comprising boscalid at a concentration of 80 µg/l and the curve (▲) represents a treatment of a composition to be sanitised comprising boscalid at a concentration of 200 µg/l. A residual amount of boscalid of less than 80% is obtained.

EXAMPLE 7

Advantages Provided by a Method and a Device for Decontamination in Accordance with the Invention A comparative study of the impact provided by exposing the *Xenopus laevis* amphibian model to a conveying composition comprising boscalid, sanitised or not by a decontamination method in accordance with the invention has been carried out. It was observed that a conveying composition initially comprising boscalid and sanitised by a decontamination method in accordance with the invention does not result in death (as measured in accordance with the standard OCDE 203, 1992) on the larvae of the *Xenopus laevis* amphibian biological model which were in contact with such a composition for 96 hours or for 12 days. Furthermore, it has been observed that a conveying composition initially comprising boscalid and sanitised by a decontamination method in accordance with the invention does not cause permanent damage to the DNA of the *Xenopus laevis* amphibian biological model in contact with such a composition for 12 days (in accordance with the standard ISO 21427-1, 2006), contrary to a conveying composition comprising boscalid and not sanitised by a decontamination method in accordance with the invention which results in the formation of micronuclei in the larvae of this amphibian.

EXAMPLE 8

Comparative Test

A comparative test performed with a semi-industrial pilot device as described in Example 4 and a sanitising device in accordance with the invention of a hydraulic conveyor of a plant for sorting and packaging apples as described in Example 3 was carried out.

The semi-industrial pilot device comprises a tank for composition to be treated of a volume of 1000 l, a circulation pump ensuring a flow of composition to be treated in a sanitising device with a flow rate of 6 m$^3$/h. The sanitising device comprises a single photolysis chamber comprising an inlet for water from the tank of composition to be treated and an outlet for sanitised water directed to the tank of composition to be treated. The composition to be treated comprises boscalid at an initial concentration of 25 µg/l and an initial hydrogen peroxide concentration of 2 mg/l.

The photolysis chamber is formed of a rigid tubular envelope, of which the external wall is opaque to light and forming an inner space suitable for receiving five fluorescent tubes with a longitudinal axis extending in parallel with the longitudinal axis of the rigid tubular envelope. The inner volume of the decontamination reactor is in the order of 32 l. The five fluorescent tubes are tubes of 200 W emitting light at a wavelength of 254 nm and arranged longitudinally in the tubular envelope at the five points of a regular pentagon and in contact with the water to be treated flowing in the photolysis chamber.

After 10 minutes of operation of the semi-industrial pilot device, almost all of the composition to be treated has been illuminated in the photolysis chamber. The rate of degradation of the boscalid is 58% of the initial boscalid after 10 minutes of operation of the semi-industrial pilot device.

A hydraulic conveyor of a plant for sorting and packaging apples containing a volume of 90 m$^3$ of water as composition for conveying Ariane, Rosy Glow and Pink Lady apples comprises a sanitising device in accordance with the invention formed of six photolysis chambers mounted in series, each chamber comprising five fluorescent tubes having an individual power of 200 W. The flow rate of the composition for conveying apples in the sanitising device is 36 m$^3$/h. It has been observed that the plurality of photolysis chambers mounted in series allows a rate of degradation of 96% of the initial boscalid to be achieved with a flow rate of the composition to be treated of 36 m$^3$/h and for an average residence time of the conveying composition in the sanitising device in the order of 19 seconds.

It goes without saying that the invention can cover numerous embodiment variants and applications. In particular, a hydraulic conveyor, a sanitising device and a sanitising method in accordance with the invention are subject to an infinite number of variants in the implementation of such a hydraulic conveyor and in its application to floating fruit and/or vegetables.

The invention claimed is:

1. Hydraulic conveyor for floating objects selected from the group formed of fruit and vegetables, of the type having recirculation of a liquid composition, named conveying composition, for conveying the floating objects, said hydraulic conveyor being provided with at least one device for sanitising said conveying composition;
    wherein at least one sanitising device comprises:
        at least two irradiation devices arranged to be able to irradiate a composition, named composition to be sanitised, formed by mixing at least some of said conveying composition and an amount of a composition, named photoreactive composition, comprising at least one photosensitive compound selected to be able to form, under the effect of irradiation by at least one irradiation device, at least one compound, named active compound, able to transform by chemical reaction at least one pollutant compound of said conveying composition into a non-pollutant compound; and
        at least two photolysis chambers mounted in series such that said composition to be sanitised can flow successively into an inner volume of each of said at least two photolysis chambers, at least one irradiation device being arranged in the inner volume of each photolysis chamber, the hydraulic conveyor further comprises a device for mixing conveying composition and photoreactive composition upstream of the sanitising device.

2. Conveyor according to claim 1, wherein at least one sanitising device is adapted to have a flow of composition to be sanitised pass through it and to allow the irradiation of the composition to be sanitised by at least one irradiation device between an inlet for a flow of composition to be sanitised drawn into a hydraulic channel of the conveyor, and an outlet for the flow of composition, named sanitised composition, directed towards a hydraulic channel of the conveyor.

3. Conveyor according to claim 1, further comprising at least one circulation pump for composition to be sanitised formed from the conveying composition in the sanitising device.

4. Conveyor according to claim 1, further comprising a pump for distributing photoreactive composition into said conveying composition.

5. Conveyor according to claim 1, wherein in that at least one photolysis chamber is in the shape of a cylinder of revolution and includes a plurality of light sources in the form of tubes, each light source extending in parallel with the longitudinal axis of said photolysis chamber and facing one another, the plurality of light sources being distributed in said photolysis chamber so as to be positioned at the points of a regular polygon, as seen in any cross-section of said photolysis chamber.

6. Conveyor according to claim 5, wherein the light sources of the plurality of light sources are uniformly distributed in the inner volume of said photolysis chamber.

7. Conveyor according to claim 5, wherein the sanitising device comprises an inlet for photoreactive composition located upstream of a first chamber of the plurality of photolysis chambers.

8. Plant for sorting floating objects such as fruit or vegetables comprising at least one hydraulic conveyor according to claim 1.

9. Method for sanitising a liquid composition, named conveying composition, for conveying floating objects selected from the group formed of fruit and vegetables, of a hydraulic conveyor of the type having recirculation of said conveying composition, wherein:
- at least some of said conveying composition is mixed with an amount of composition, named photoreactive composition, comprising at least one photosensitive compound selected to be able to form, under the effect of irradiation by at least two irradiation device, at least one compound, named active compound, able to transform by chemical reaction at least one pollutant compound of said conveying composition into a non-pollutant compound; and
- this mixture, named composition to be sanitised, is subjected to this irradiation so as to form an at least partially sanitised composition;

wherein said composition to be sanitised is subjected to this irradiation in a sanitising device which has a flow of said composition to be sanitised passing through it, the sanitising device comprising at least two photolysis chambers mounted in series such that said composition to be sanitised flows successively into an inner volume of each of said at least two photolysis chambers, at least one irradiation device being arranged in the inner volume of each photolysis chamber.

10. Method according to claim 9, wherein at least one photosensitive compound is hydrogen peroxide.

11. Method according to claim 9, wherein the irradiation is illumination by ultraviolet light radiation.

12. Method according to claim 9, wherein the amount of said photoreactive composition and irradiation conditions are adapted such that said sanitised conveying composition has a residual amount of photosensitive compound which is less than a predetermined maximum amount allowed by regulations.

13. Method according to claim 9, wherein at least one pollutant present in said conveying composition is a pesticide of the group formed of fungicides, bactericides and insecticides.

14. The conveyor of claim 5, wherein each photolysis chamber is in the shape of a cylinder of revolution and includes a plurality of light sources in the form of tubes.

15. Conveyor according to claim 2, further comprising at least one circulation pump for composition to be sanitised formed from the conveying composition in the sanitising device.

16. Conveyor according to claim 2, further comprising a pump for distributing photoreactive composition into said conveying composition.

17. Conveyor according to claim 3, further comprising a pump for distributing photoreactive composition into said conveying composition.

* * * * *